United States Patent [19]

Tsubaki et al.

[11] Patent Number: 5,790,742
[45] Date of Patent: Aug. 4, 1998

[54] OPTICAL FIBER

[75] Inventors: Kenji Tsubaki, Katano; Tsuneyoshi Kamae, Tokyo; Hiroshi Yokogawa, Hirakata; Masaru Yokoyama, Yao; Kenji Sonoda, Shijonawate, all of Japan

[73] Assignee: Matsushita Electric Works, Ltd., Osaka, Japan

[21] Appl. No.: 723,246

[22] Filed: Sep. 30, 1996

[30] Foreign Application Priority Data

Dec. 12, 1995 [JP] Japan .................................. 7-323061
Feb. 28, 1996 [JP] Japan .................................. 8-040218

[51] Int. Cl.⁶ .................................................. G02B 6/00
[52] U.S. Cl. .................................................. 385/144
[58] Field of Search .............................. 156/145, 191,
  156/194, 195, 200, 214, 221, 244.13; 427/160,
  165, 387, 389.7; 264/178 R; 219/464, 518;
  428/116, 396, 408, 417, 76, 331; 528/99,
  103; 385/129, 122, 141, 144, 147

[56] References Cited

U.S. PATENT DOCUMENTS

| | | | |
|---|---|---|---|
| 3,712,705 | 1/1973 | Marcatili | 385/144 |
| 3,901,674 | 8/1975 | Strack et al. | 385/144 |
| 3,988,190 | 10/1976 | McWilliams | 156/145 |
| 4,402,927 | 9/1983 | von Dardel et al. | 423/355 |
| 4,432,956 | 2/1984 | Zarzycki et al. | 423/338 |
| 4,610,863 | 9/1986 | Tewari et al. | 423/338 |
| 4,919,665 | 4/1990 | Banerjee et al. | 131/194 |
| 5,042,509 | 8/1991 | Banerjee et al. | 131/71 |
| 5,124,364 | 6/1992 | Wolff et al. | 521/55 |
| 5,137,927 | 8/1992 | Wolff et al. | 521/54 |
| 5,190,610 | 3/1993 | Ek | 156/89 |
| 5,401,781 | 3/1995 | Hagen | 264/178 R |
| 5,496,527 | 3/1996 | Yokogawa et al. | 423/338 |
| 5,576,054 | 11/1996 | Brown | 427/160 |

FOREIGN PATENT DOCUMENTS

5279011  10/1993  Japan .
7138375   5/1995  Japan .

OTHER PUBLICATIONS

Hrubesh et al., "Processing and Characterization of High Porosity Aerogel Films", Mater. Res. Soc. Symp. Proc. vol. 371, pp. 195–204 (1995).

Poelz, "Aerogel in High Energy Physics", Aerogels Institut fur Expermentalphysik der Universitat, D–2000 Hamburg, F.R.G., pp. 176–187 (1985).

Primary Examiner—Akm E. Ullah
Attorney, Agent, or Firm—Greenblum & Bernstein P.L.C.

[57] ABSTRACT

An optical fiber comprises a core 1 extending in a longitudinal direction and a cladding 3 of silica aerogel preferably having a hydrophobic property to provide a high optical transmission efficiency. The silica aerogel of the cladding is prepared by polymerizing a hydrolyzed alkoxysilane before a supercritical drying treatment and is subjected to a hydrophobic treatment before or during the supercritical drying.

12 Claims, 11 Drawing Sheets

OPTICAL FIBER

BACKGROUND OF THE INVENTION

This invention relates to optical fibers wherein silica aerogel having porous silica skeleton structures is used as a cladding material for enclosing a core of the optical fiber to thereby provide a high optical transmission efficiency.

The optical fiber, in general, comprises a core and a cladding around the core and has been utilized as a light guide for transmission of sun light, electric light and laser light in medical equipments, scientific equipments, household equipments and factory electronic equipments.

Hitherto, for the core of optical fibers, there have been used glasses such as quartz glass and multicomponent glasses, plastics such as acrylic resins including methyl methacrylate, and styrol resins, and transparent liquids such as tetrachloroethylene. For the cladding, there have been used soda lime glasses and boro-silicate glasses with a refractive index lower than that of the core, and fluoro resins such as tetra-fluoro ethylene/polyfluoro vinylidene copolymer.

Now, even though the refractive index of the cladding is designed to be lower than that of the core, the acceptance angle of the optical fiber which is determined by the total reflection angle of light at the boundary surface between the core and the cladding, varies largely depending on the magnitude of the difference of their refractive indexes. The amount of light accepted into the optical fiber is determined by the acceptance angle of the fiber.

In general, the light-acceptance angle is determined by the refractive index of the core ($n^1$) and that of the cladding ($n^2$) and that of the medium from which light enters the optical fiber.

The numerical aperture is a quantity generally used to characterize optical fibers and is related to the light-acceptance angle θ given by the following equation:

Numerical aperture=$n.\sin\theta=(n_1^2-n_2^2)^{1/2}$

If the light enters the fiber from air (n=1.0). Consequently, the light-acceptance angle of optical fiber increases as the difference between the refractive indices of the core and the cladding increases. In other words, the difference between the two indices must be large to transmit large quantity of light. This can be achieved by increasing the refractive index of the core and/or decreasing that of the cladding.

In practical applications, pure quartz glass are extensively used for the core because of its small attenuation and excellent thermal and chemical stability. However, the refractive index of the quartz glass is as low as n=1.46, resulting in difficulty in obtaining high light transmission efficiency unless a cladding with a very low refractive index is found. There is an established method to lower the refractive index of glass by adding $B_2O_3$ or fluorine. There is also an established method to increase the refractive index by adding dopants such as $TiO_2$, $Ta_2O_5$, $SnO_2$, $Nb_2O_5$, $ZrO_2$, $Yb_2O_3$, $La_2O_3$, and $Al_2O_3$. In some cases, plastic materials are used for the cladding of quarty fibers. The plastic materials used are silicone resins such as polysiloxane and silicon rubber; and fluoro resins such as ethylene propylene fluoride and vinylidene fluoride. Plastics materials with refractive index of about 1.29–1.33 are available.

As described above, the light-acceptance angle of the optical fiber is determined by Numerical aperture for a given refractive index of the medium (n). For example, when flint glass F2 (refractive index: 1.62) is used for the core and soda lime glass (refractive index: 1.52) for the cladding, the numerical aperture is 0.56 and the light-acceptance angle θ is 34° for n=1 (air). When methacrylic resin (refractive index: 1.49) is used for the core and a fluoro resin (refractive index: 1.39) for the cladding in plastic optical fibers, the numerical aperture is 0.54 and the light-acceptance angle θ is 32° for n=1 (air). In this way, conventional core and claddings make the light-acceptance angle ranges from about 30° to 50°0 for n=1 (air), resulting in difficulty of transmitting a large quantity of light.

In addition, there are examples (U.S. Pat. Nos. 3,712,705 and 3,901,674) in which an air or gas jacket is arranged between the core and the outer light shield and used air or gas in place of the conventional cladding. These examples require some support structures for the core and the air jacket, which makes it difficult to implement this technology to the optical fiber. Further, light will be lost at places where the support structure touches the core. Because of the above, the technology will have no applicability in the optical fiber field.

SUMMARY OF THE INVENTION

This invention has been made under the above-mentioned situation and it is a first object of the present invention to provide optical fibers which materialize large light-acceptance angles and transmits larger quantity of light on the basis of the theory that the difference between the refractive indices of the core and the cladding determines the large quantity of light transmitted.

A second object of the present invention is to provide claddings which can be replaced the air jacket.

Furthermore, a third object of the present invention is to provide optical fibers that do not require any support structure between the core and the outer optical shield.

It is well known that silica aerogel is a material useful for the following thermal insulating purposes. However, the material has never been used as a cladding of the optical fiber, and it has been found for the first time that the silica aerogel is useful as the cladding of the optical fiber:

U.S. Pat. No. 4,402,927 discloses silica aerogel having an extremely high thermal insulation capacity which is useful for thermal insulator. U.S. Pat. No. 4,432,956 discloses silica aerogel which contains organic —OR groups and a relatively large amount of water, so the silica aerogel is used for lens materials as well as heat insulating materials. U.S. Pat. No. 4,610,863 discloses a transparent aerogel array which can be replace the air gap within a double glazed window to provide a substantial reduction in heat transfer. U.S. Pat. No. 5,137,927 discloses composite foams of low thermal conductivity which comprises a) 20–80% by volume of silica aerogel particles, b) 20–80% by volume of a styrene polymer foam and c) conventional additives. U.S. Pat. No. 5,496,527 discloses a hydrophobic aerogel which is used for heat insulator having an excellent transparency.

According to a first aspect of the present invention, there can be provided an optical fiber comprising:

a core extending in a longitudinal direction and a cladding covering the outer peripheral surface of said core and having a lower refractive index than that of said core, wherein said cladding comprises silica aerogel having a porous skeleton structure represented by the formula:

where n is a positive integer.

The silica aerogel used in the present invention contains silica particles linked together like a rosary to have micro pores uniformly distributed as shown in FIG. 1, and preferably have a primary particles diameter of 1 to 10 nm to improve optical transparency.

The optical fiber according to the present invention may comprise the outermost covering layer made of any other material than the silica aerogel to optically shield the fiber and improve resistance to weather and stress for protection of the cladding.

In case of using the outermost covering layer, the cladding may be formed partially from the silica aerogel wherein the silica aerogel is in a shape of rings arranged at intervals in a longitudinal direction of said core and air spaces are defined between said neighboring silica aerogel rings. Alternatively, the silica aerogel may be in a shape of attachment spacer such as beads distributed uniformly in the longitudinal direction and a circumference direction of the core.

In an embodiment of the present invention, the cladding may comprise plural layers laminated in a radial direction. In this case, the outermost layer may be a silica aerogel single layer. Alternatively, the outermost layer may be silica aerogel rings arranged in parallel and having air spaces therebetween. The innermost layer can provide a protection for the core. In case of using a glass as the core material, the innermost plastic layer provides the core with a flexibility. In case of using a plastic core, the inner layer provides the core with protection against marring.

In an embodiment of the present invention, the cladding may be formed by an organic modified hydrophobic silica aerogel, which may be prepared by polymerizing a hydrolyzed alkoxysilane before a supercritical drying treatment. The hydrophobic treatment should be applied thereto before or during the supercritical drying.

As apparent from FIG. 2, the preferred silica aerogel has a density of 0.02 to 0.5 g/cm$^3$ and a refractive index of 1.008 to 1.18.

BRIEF DESCRIPTION OF THE DRAWINGS

These and others, features and advantages of the present invention will become clear from the following description taken in conjugation with the preferred embodiments with reference to the accompanying drawings throughout which like parts are designated by like reference numerals, and in which:

FIGS. 11C and 11D are longitudinal and transverse sectional views, respectively, of the 18th embodiment according to the present invention;

FIGS. 11E and 11F are longitudinal and transverse sectional views, respectively, of the 19th embodiment according to the present invention;

DETAILED DESCRIPTION

The invention will be hereinafter fully described.

The optical fiber according to this invention comprises a core and a cladding which covers the outer surface of the core and provides a refractive index lower than that of the core. For the core, there are used for example, quartz glasses, multicomponent glasses, or other glasses, acrylic resins including polymethylmethacrylate (PMMA), etc., styrene resins or other transparent resins, or transparent liquids such as tetrachloroethylene, etc.

Figure 1:
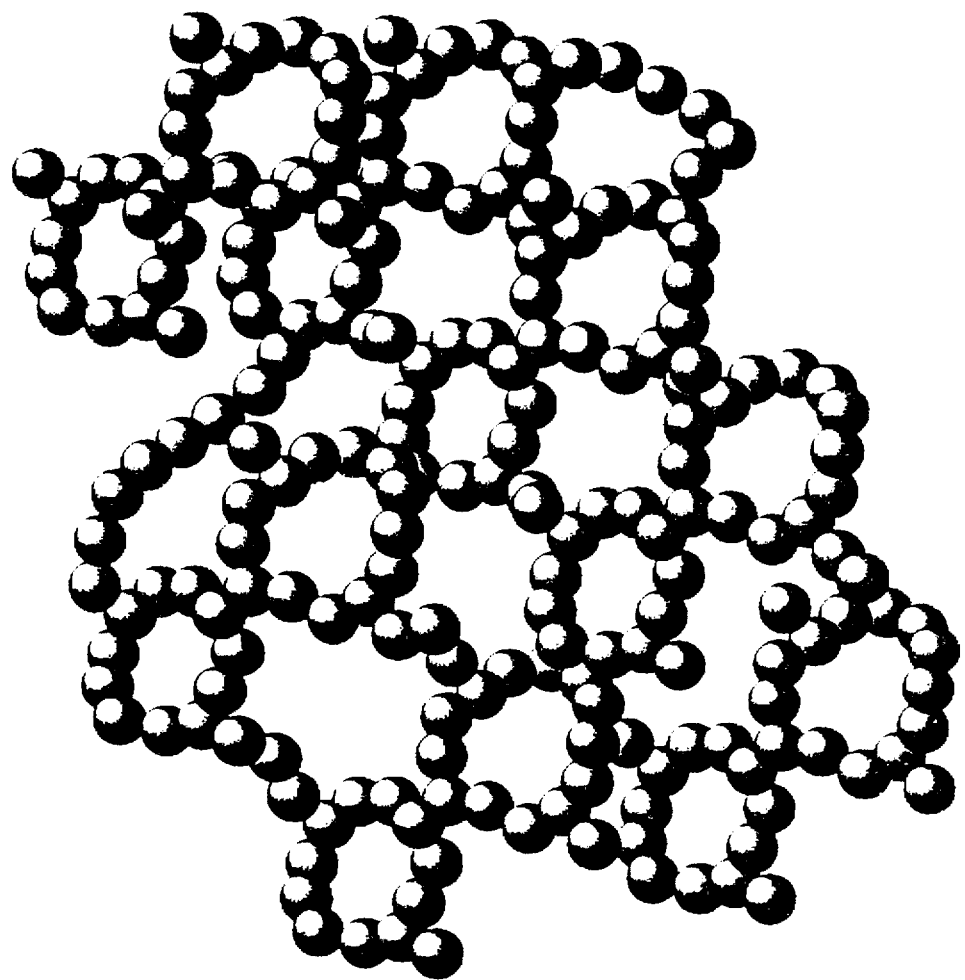
FIG. 1 is a schematic microscopic view showing a skelton structure of silica aerogel.
Figure 2:
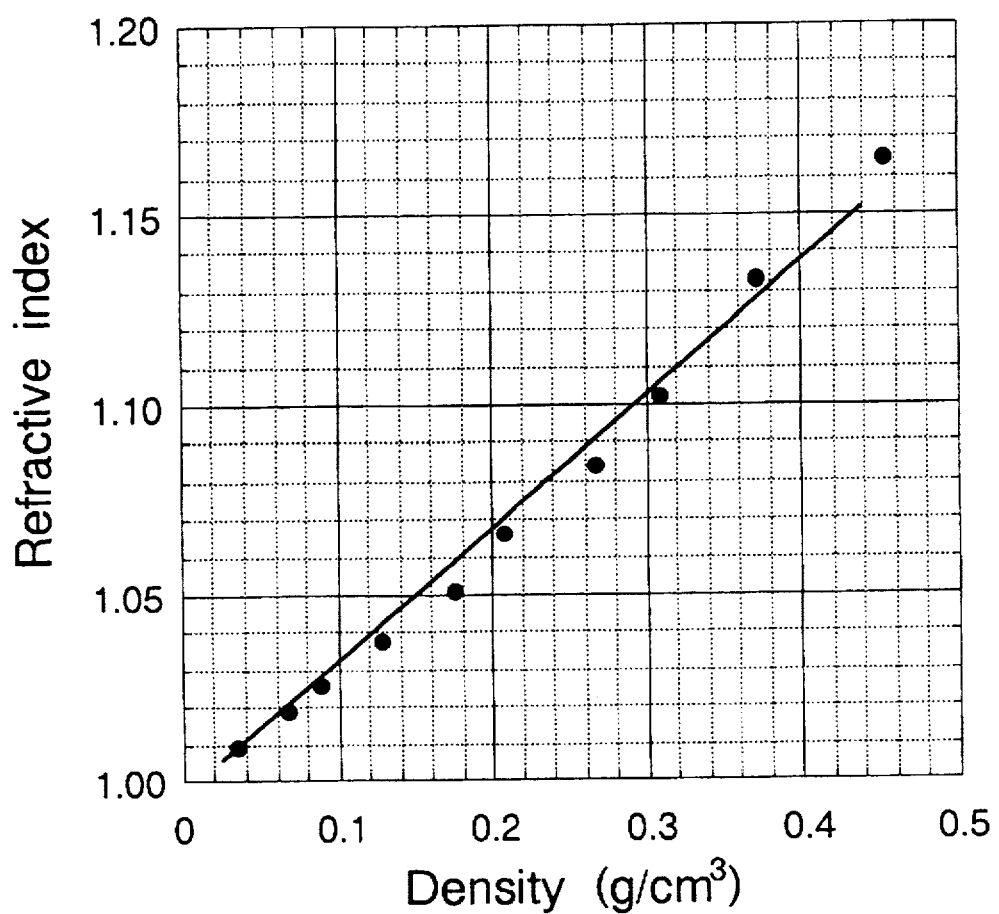
FIG. 2 is a graph showing relation between the density of silica aerogel and the refractive index thereof.

For the cladding, there is used a silica aerogel comprising porous silica skeleton structures. This silica aerogel is a porous substance in which spherical silica particles as shown in FIG. 1 are connected in the form of a string of beads and which has nearly uniform voids ranging from 50 to 60 nm. The silica particle is imparted the hydrophobic property by organic modification at the stage of gel-form compound (alkogel) formed by hydrolysis and polymerization of alkoxy silane, and the primary particle size is between 1 nm and 10 nm, and particularly preferably between 1 nm and 5 nm. Consequently, because the silica aerogel has the particle size and the void between particles far smaller than wavelength of light, it provides transparency in spite of porous substance and optical loss by absorption or scattering of light can be suppressed to minimum. The density of the said silica aerogel can be freely varied by the compounding ratio of raw materials of silica aerogel, and it is not limited to this but is preferably between 0.02 g/cc and 0.5 g/cc. In such case, there is a relationship between the density and refractive index of silica aerogel as shown in FIG. 2 and the refractive index ranges from 1.008 to 1.18. In this event, the specific refractive index difference can be dramatically increased, and the light-acceptance angle in such event can be brought to 90° at maximum. Consequently, it is possible to converge light at a wide light-acceptance angle and to transmit a larger quantity of light, and at the same time to increase the light-emitting angle at the light-emitting end of optical fiber.

This silica aerogel can be manufactured by drying the wet gel-form compound comprising silica skeletons obtained by hydrolysis and polymerization reactions of alkoxy silane (also called silicone alkoxide or alkyl silicate) as described in U.S. Pat. Nos. 4,402,927, 4,432,956, and 4,610,863 under the existence of a solvent (scattering medium) such as alcohol or carbon dioxide at the supercritical condition exceeding the supercritical point of this solvent. It is also possible to manufacture similarly using sodium silicate as raw material as described in U.S. Pat. Nos. 5,137,297 and 5,124,364. Now, it is preferable to impart hydrophobic property to silica aerogel by hydrophobic treatment of the gel-form compound obtained by hydrolysis and polymerization reactions of alkoxy silane as disclosed in Japanese Non-examined Patent Publication No. Hei 5-279011 and No. Hei 7-138375. That is, hydrophobic silica aerogel with hydrophobic property has an ability to prevent the entry of moisture or water, and to prevent increase of refractive index or degradation of transparency.

The said cladding may comprise the said silica aerogel and air. That is, if silica aerogel partly covers the core, the portion other than silica aerogel comprises air with the refractive index of 1.0, which is preferable from the viewpoint of the difference of specific refractive index with the core. In addition, it is possible to reduce the amount of silica aerogel, which is outstanding from the viewpoint of flexibility.

In addition, the said cladding may consist of a plurality of clad layers, and in this event, a plurality of these clad layers must have the refractive index gradually reduced as the light goes from the innermost clad layer towards the outermost clad layer and have the outermost clad layer made up by the said silica aerogel or the said silica aerogel and air.

Figure 13A:
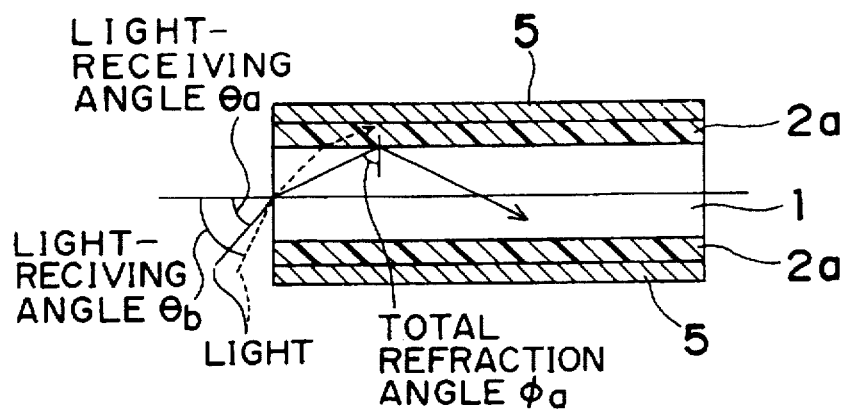
FIGS. 13A and 13B are longitudinal and transverse sectional views, respectively, of the 22th embodiment according to the present invention.
Figure 13B:
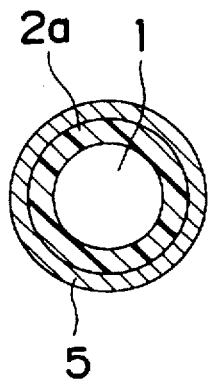

As shown in FIGS. 13A and 13B, in the conventional optical fiber of the acceptance angle $\theta_a$, the light entering the core 1 at an angle wider than the acceptance angle $\theta_a$ obtained from each refractive index of the core 1 and the first clad layer 2a enters the first clad layer 2a without total-reflecting at the boundary surface between the core 1 and the first clad layer 2a, and thereafter is absorbed by the coating material 5 and is not transmitted.

Figure 7A:
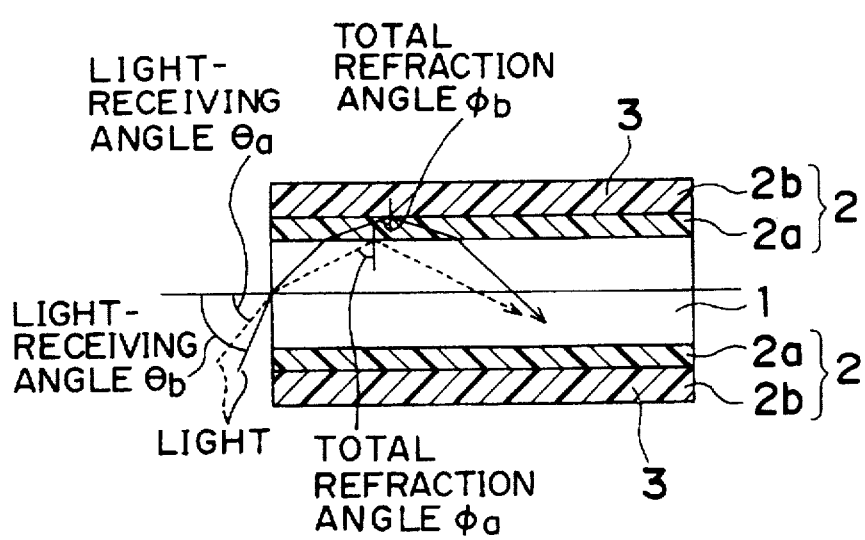
FIGS. 7A and 7B are longitudinal and transverse sectional views, respectively, of the 9th embodiment according to the present invention.
Figure 7B:
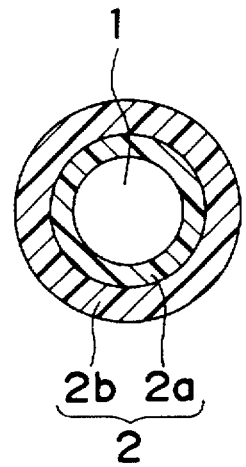

However, as shown in FIGS. 7A and 7B because the optical fiber according to this invention uses silica aerogel 3 and air 4 with a small refractive index as the second layer 2b around the first clad layer 2a, light enters the core 1 at the wider acceptance angle $\theta_b$ than the acceptance angle $\theta_a$ and it is possible to transmit the light while allowing it to totally reflect at the boundary surface between the first clad layer 2a and the second clad layer 2b. Consequently, it is possible to collect light at a wide light-acceptance angle which the conventional optical fiber is unable to be transmitted and to transmit a greater quantity of light, and it is also possible to increase the emitting light angle at the light emitting end of the optical fiber.

The material of the clad layer other than the outermost layer is not particularly limited, but the material with excellent transparency which does not generate light scattering or absorption is preferable, and examples include soda lime or boro-silicate glasses; fluoro resins; acrylic or silicone hard coating resins.

The optical fiber according to this invention may have the outer surface protected with a coating material to protect the said cladding. The coating material is not particularly limited but examples of the coating material include resins such as polyethylene, crosslinked polyethylene, polyvinyl chloride, or polyolefin elastomer or metals such as stainless steel. It is preferable from the viewpoint of productivity if the se coating materials are in the form of film which can permeate alcohol or hydrophobic treatment agent, because hydrophobic treatment and supercritical drying can be carried out with the coating materials integrated.

Now referring to drawings, the forms of optical fiber according to this invention will be described.

Figure 3A:
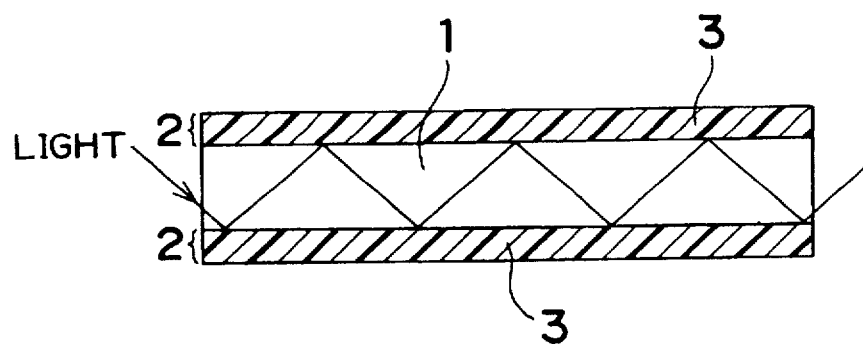
FIGS. 3A and 3B are longitudinal and transverse sectional views, respectively, of the first embodiment according to the present invention.
Figure 3B:
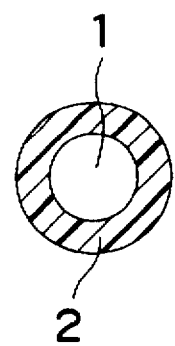
Figure 3C:
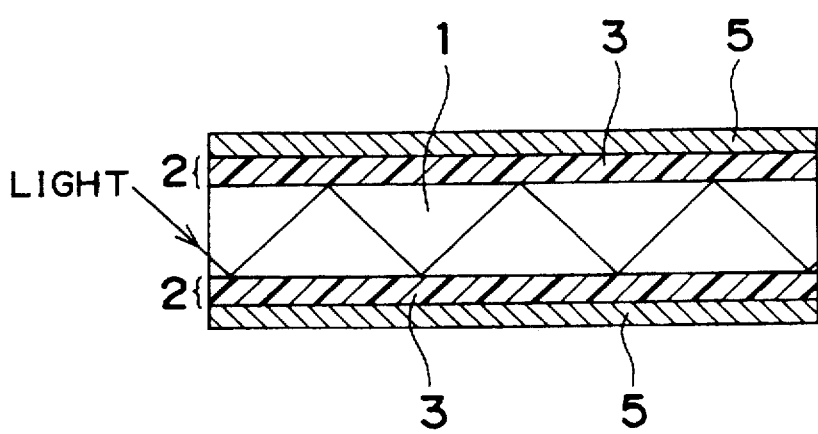
FIGS. 3C and 3D are longitudinal and transverse sectional views, respectively, of the second embodiment according to the present invention.
Figure 3D:
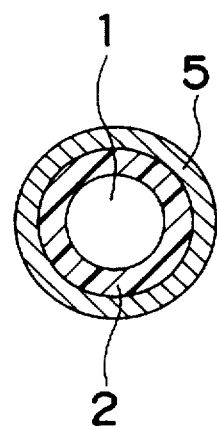

As shown in FIGS. 3A and 3B, there is a form in which the cladding 2 comprising silica aerogel 3 totally covers the core 1. Now, as shown in FIGS. 3C and 3D, the coating material 5 may be located outside the cladding 2 to protect the cladding 2 made of silica aerogel 3.

Figure 4A:
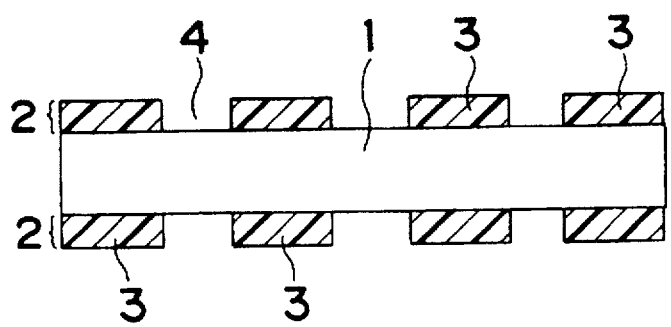
FIGS. 4A and 4B are longitudinal and transverse sectional views, respectively, of the third embodiment according to the present invention.
Figure 4B:
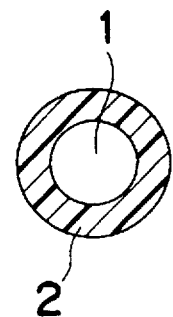
Figure 4C:
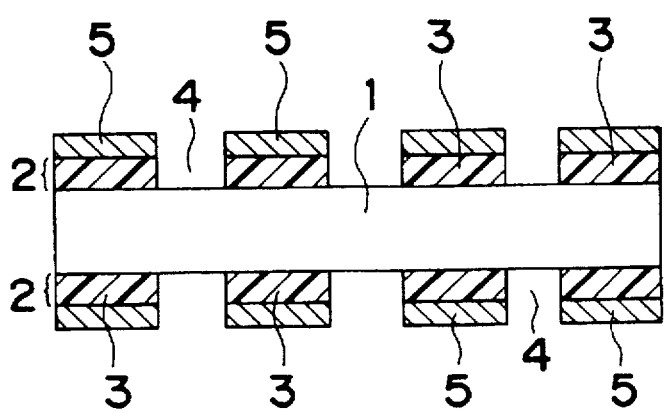
FIGS. 4C and 4D are longitudinal and transverse sectional views, respectively, of the fourth embodiment according to the present invention.
Figure 4D:
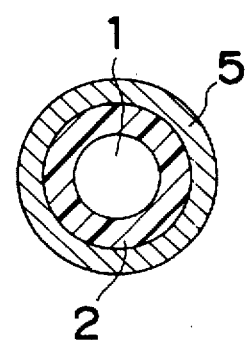
Figure 4E:
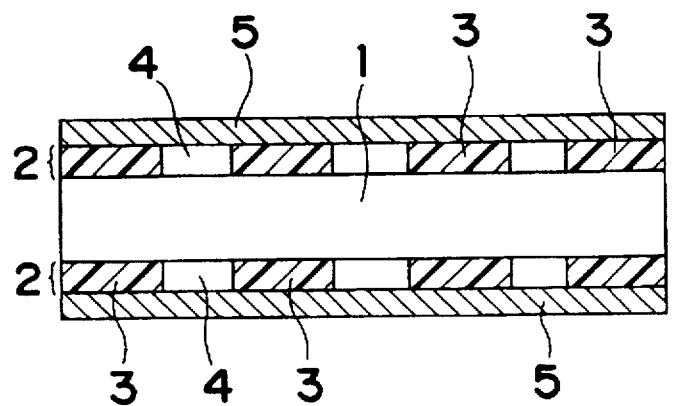
FIGS. 4E and 4F are longitudinal and transverse sectional views, respectively, of the fifth embodiment according to the present invention.
Figure 4F:
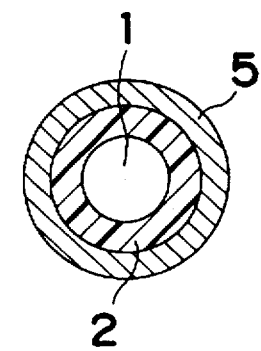
Figure 5A:
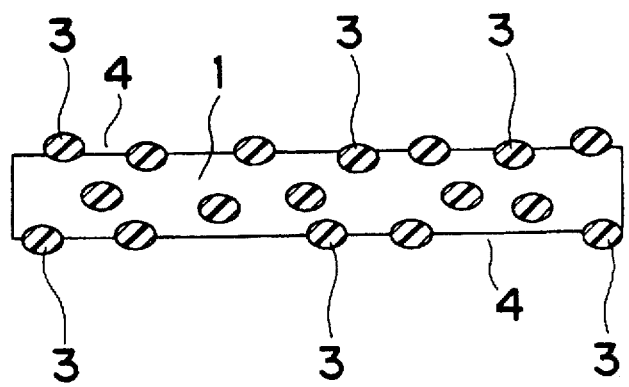
FIGS. 5A and 5B are longitudinal and transverse sectional views, respectively, of the sixth embodiment according to the present invention.
Figure 5B:
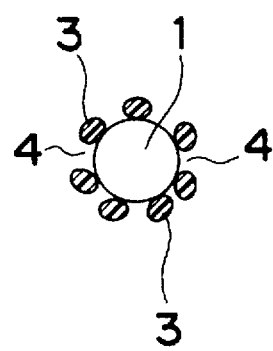

Alternatively, as shown in FIGS. 4A, 4B, 4C, 4D, 4E and 4F or FIGS. 5A and 5B, the cladding 2 may comprise silica aerogel 3 and air 4. That is, silica aerogel 3 covers part of the outer surface of the core 1. As shown in FIG. 4A, ring-form silica aerogel 3 may cover the outer surface of the core 1 at specified intervals or as shown in FIG. 5A, granular silica aerogel 3 may partly exist around the core 1. Now, the coating material 5 may exist outside the cladding 2. This coating material 5 may cover the cladding 2 only, for example, as shown in FIG. 4C and may cover the whole optical fiber as shown in FIG. 4E.

Figure 6A:
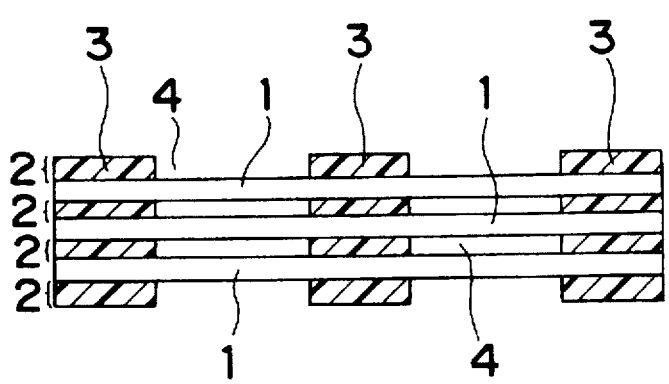
FIGS. 6A and 6B are longitudinal and transverse sectional views, respectively, of the seventh embodiment according to the present invention.
Figure 6B:
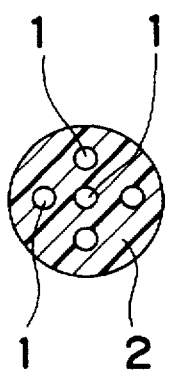
Figure 6C:
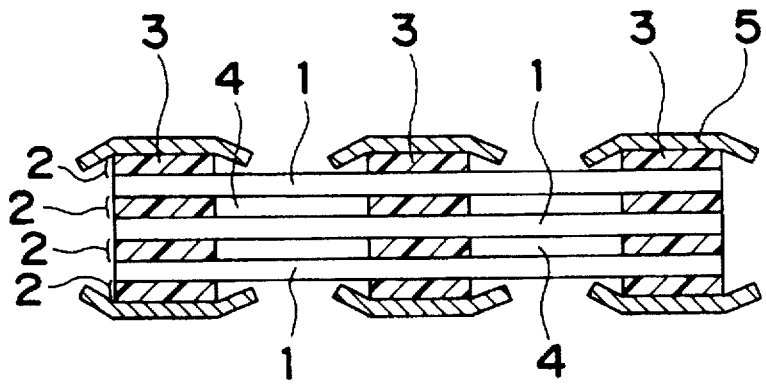
FIGS. 6C and 6D are longitudinal and transverse sectional views, respectively, of the 8th embodiment according to the present invention.
Figure 6D:
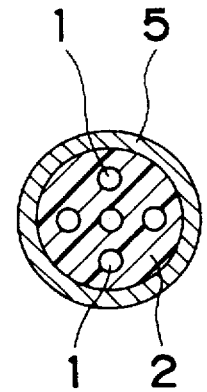

What are shown in FIGS. 3A, 3B to FIGS. 5A, 5B are forms of single-fiber core 1 made up of a single optical fiber, but the core may comprise a bundle of fibers as shown in FIGS. 6A and 6B. That is, a disc-form silica aerogel 3 with holes of the number of required cores 1 opened in advance may be used, or silica aerogel 3 may be filled into the clearance between cores 1 as cladding 2. Now, as shown in FIGS. 6C and 6D, the coating material 5 may be located outside the cladding 2 to protect silica aerogel 3.

Now, thickness, width, particle size, etc. of silica aerogel 3 should be suitably chosen within the range in which cores 1, 1 do not come in contact each other or the core 1 and the coating material 5 are not brought into contact and are not particularly limited.

Next description will be made on the cladding 2 which comprises a plurality of clad layers.

Figure 7C:
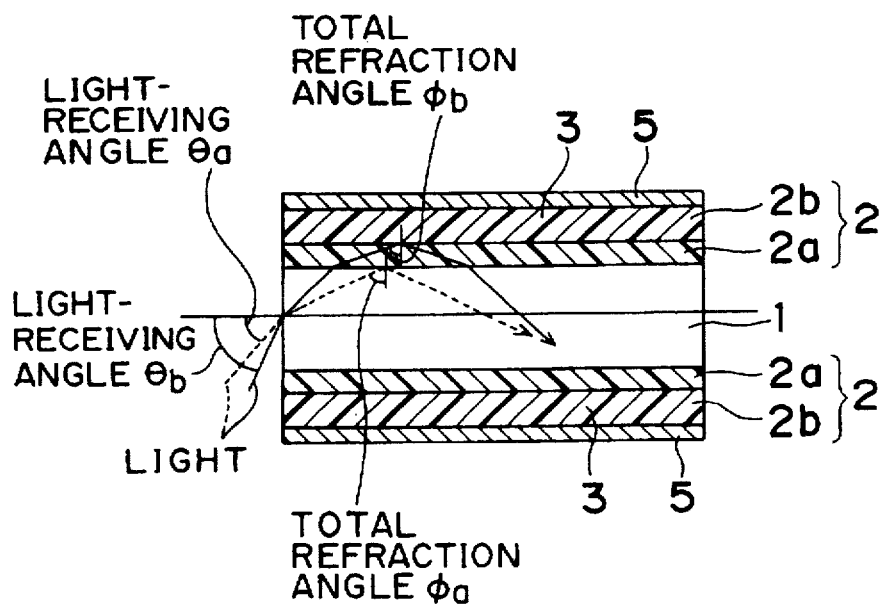
FIGS. 7C and 7D are longitudinal and transverse sectional views, respectively, of the 10th embodiment according to the present invention.
Figure 7D:
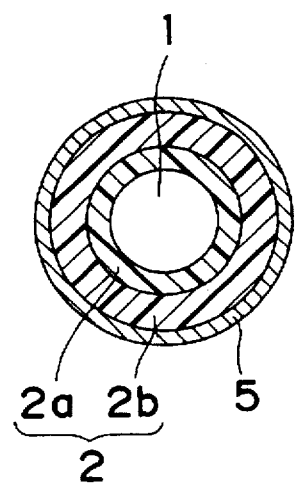

As shown in FIGS. 7A and 7B, for example, the optical fiber is formed with the core 1 with a refractive index $n_1$, the first clad layer 2a with a refractive index $n_{2a}$ which is lower than that of the core 1, and the second clad layer 2b with the refractive index $n_{2b}$ which is lower than that of the first clad layer 2a. As shown in FIG. 7A, there is an example in which the second clad layer 2b comprises silica aerogel 3 and the first clad layer 2a is completely coated. Now, as shown in FIGS. 7C and 7D, the coating material 5 may exist to protect the second clad layer 2b.

Figure 8A:
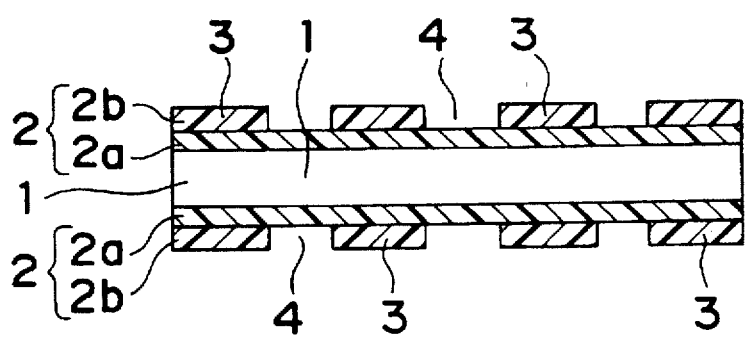
FIGS. 8A and 8B are longitudinal and transverse sectional views, respectively, of the 11th embodiment according to the present invention.
Figure 8B:
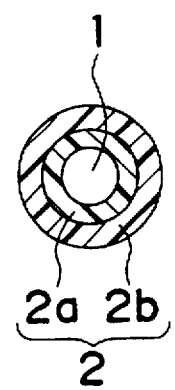
Figure 8C:
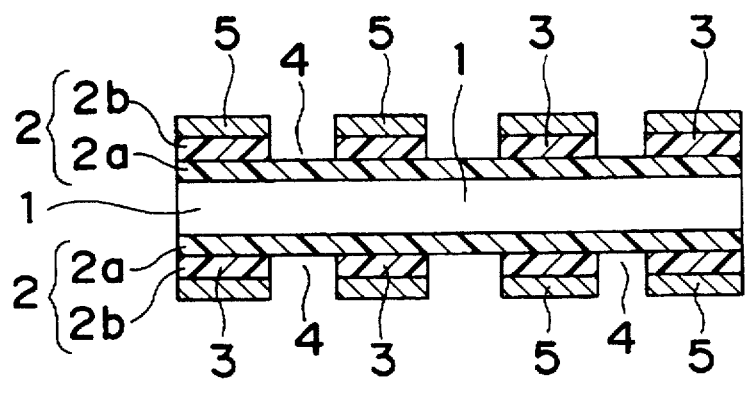
FIGS. 8C and 8D are longitudinal and transverse sectional views, respectively, of the 12th embodiment according to the present invention.
Figure 8D:
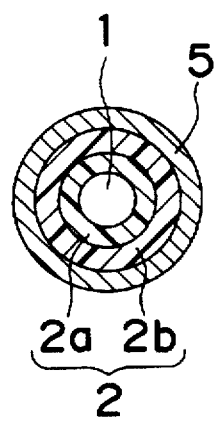
Figure 8E:
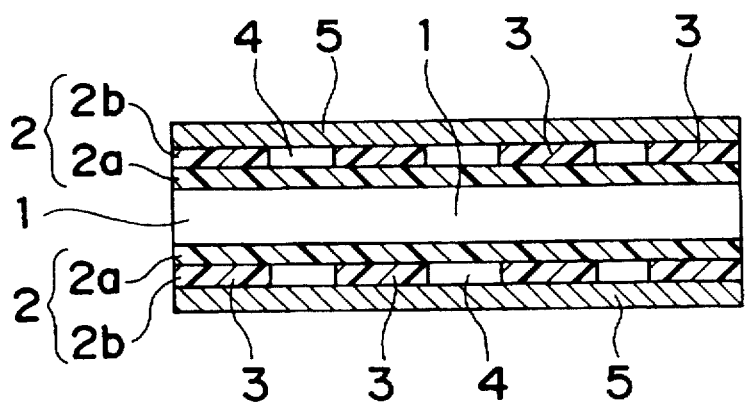
FIGS. 8E and 8F are longitudinal and transverse sectional views, respectively, of the 13th embodiment according to the present invention.
Figure 8F:
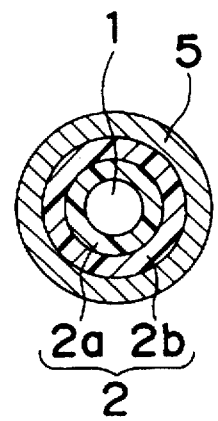
Figure 9A:
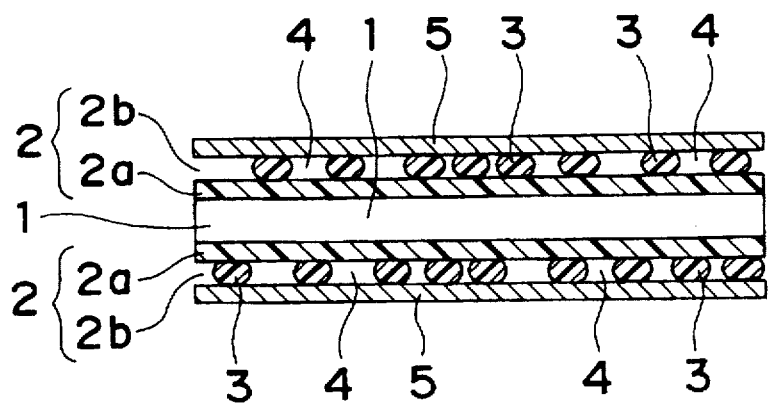
FIGS. 9A and 9B are longitudinal and transverse sectional views, respectively, of the 14th embodiment according to the present invention.
Figure 9B:
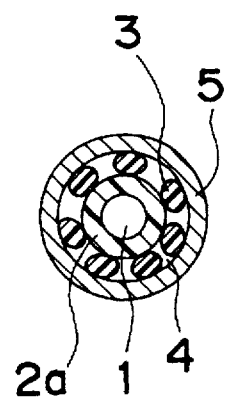

As shown in FIGS. 8A to 8F or FIGS. 9A and 9B, the second clad layer 2b may comprise silica aerogel 3 and air 4. That is, as shown in FIGS. 8A to 8F, ring-form silica aerogel 3 may cover part of the outer surface of the first clad layer 2a at specified intervals, and as shown in FIGS. 9A to 9B, granular silica aerogel 3 may partly exist around the first clad layer 2a. Now, outside the second clad layer 2b, the coating material 5 may exist. This coating material 5 may coat the second clad layer 2b only as shown in FIG. 8B, and as shown in FIGS. 8E and 8F, it may cover the whole optical fiber.

Figure 10A:
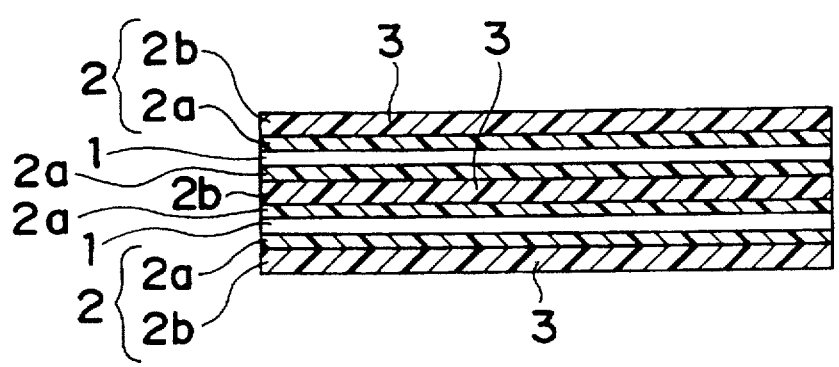
FIGS. 10A and 10B are longitudinal and transverse sectional views, respectively, of the 15th embodiment according to the present invention.
Figure 10B:
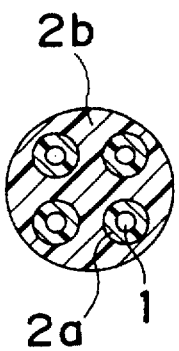
Figure 10C:
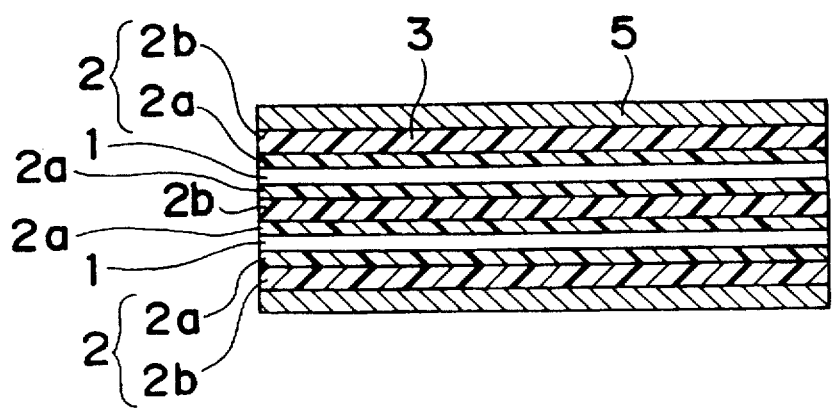
FIGS. 10C and 10D are longitudinal and transverse sectional views, respectively, of the 16th embodiment according to the present invention.
Figure 10D:
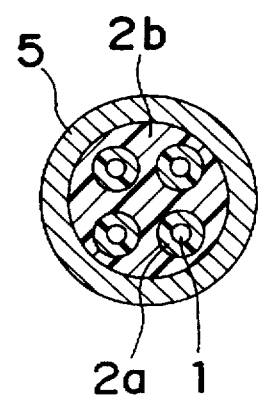
Figure 11A:
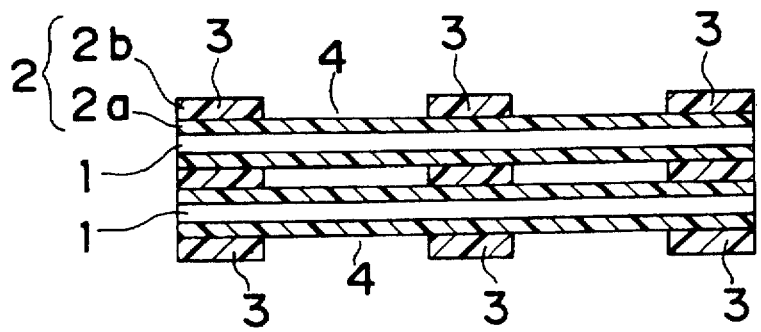
FIGS. 11A and 11B are longitudinal and transverse sectional views, respectively, of the 17th embodiment according to the present invention.
Figure 11B:
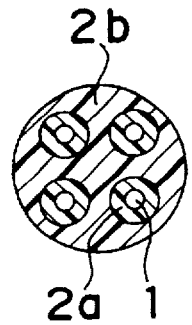
Figure 11C:
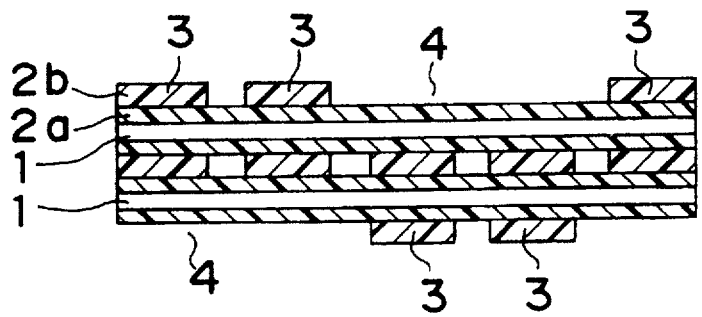
Figure 11E:
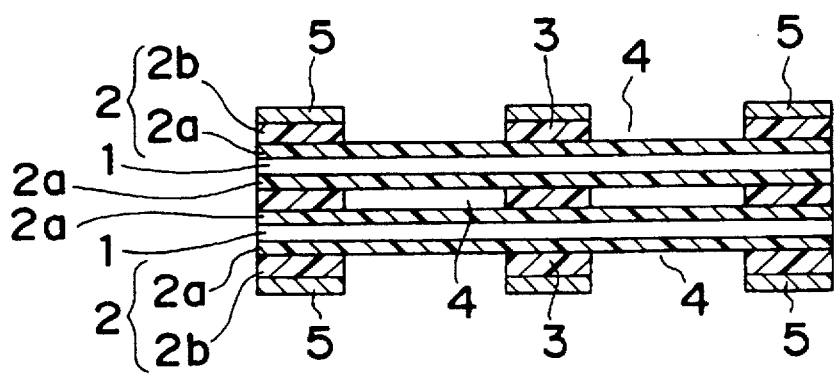
Figure 11G:
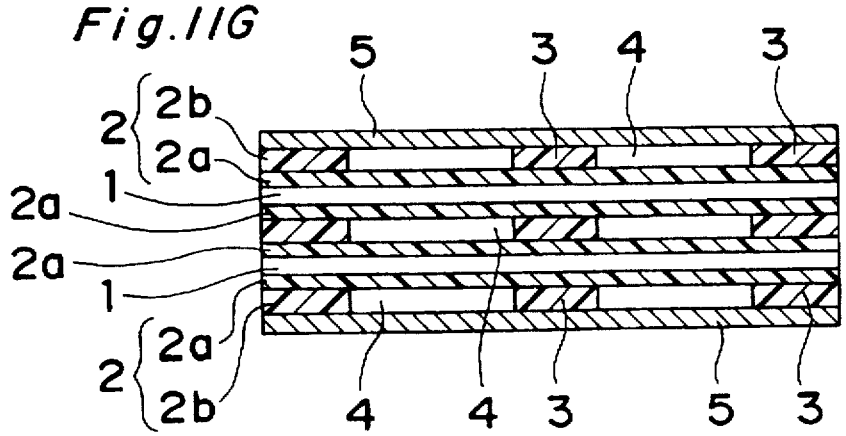
FIGS. 11G and 11H are longitudinal and transverse sectional views, respectively, of the 20th embodiment according to the present invention.
Figure 11H:
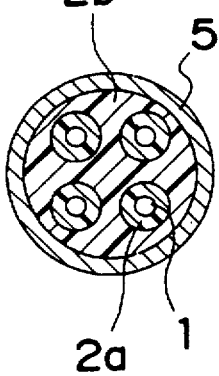
Figure 12A:
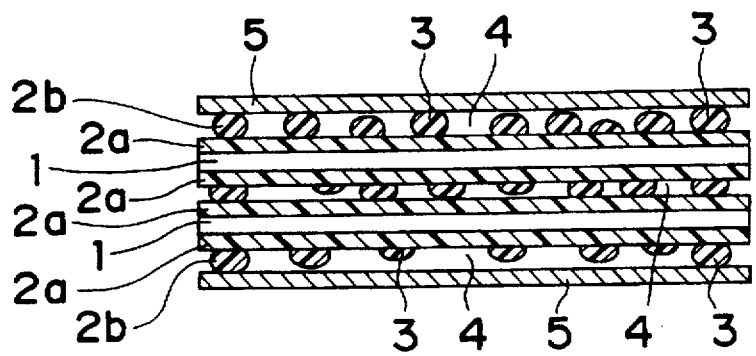
FIGS. 12A and 12B are longitudinal and transverse sectional views, respectively, of the 21th embodiment according to the present invention.
Figure 12B:
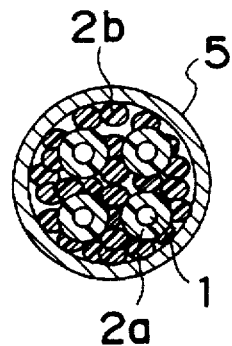

What are shown in FIGS. 7A to 7D, FIGS. 8A to 8F and FIGS. 9A to 9B show examples using single-piece core, but for example, as shown in FIGS. 10A to 10D, FIGS. 11A to 11H and FIGS. 12A to 12B, a plurality of cores may be bound and used. That is, as shown in FIGS. 10A and 10B, silica aerogel 3 is inserted as the second clad layer 2b into all the single-piece cores 1 coated with the first clad layer 2a, or silica aerogel 3 is filled as disk-form second clad layer 2b with a specified number of holes provided as shown in FIGS. 11A, 11C or as shown in FIG. 12A, bead-form silica aerogel 3 is filled. These may be coated with the coating material 5 as shown in FIG. 10C, FIG. 11E and 11G, and FIG. 12A.

With respect to the profile of the optical fiber end face, plane, dome, irregular surface, ground glass, and other profiles can be mentioned. In this case, like optical fibers according to this invention, if the light-acceptance angle is large, a measure for making the end face a dome can be mentioned in order to reduce reflection at the light entering surface.

Figure 14:
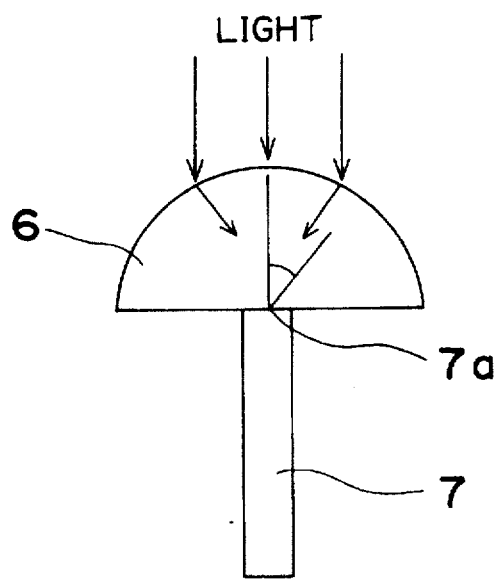
FIG. 14 is a schematic view showing combination of a conversing lens and an optical fiber according to the present invention.

For the optical fiber according to this invention, it is possible to make the light-acceptance angle θ at the end face $7_a$ of optical fiber 7 easily 90 degrees as shown in FIG. 14, and it provides excellent converging efficiency. The converging efficiency when it is irradiated from all directions (360°) to the end face $7_a$ of the optical fiber 7 can be given by the following equation using the light-acceptance angle.

Converging efficiency (%)=100(1−cosθ)/2

When the light-acceptance angle θ is 90°, all the light at the upper part from the end face $7_a$ of the optical fiber can be collected, resulting in 50% light-collecting efficiency. Table 1 shows converging efficiency at various light acceptance angle θ.

TABLE 1

| Light-acceptance angle | Light-collecting efficiency (%) |
|---|---|
| 45° | 14 |
| 60° | 25 |
| 90° | 50 |

Figure 15A:
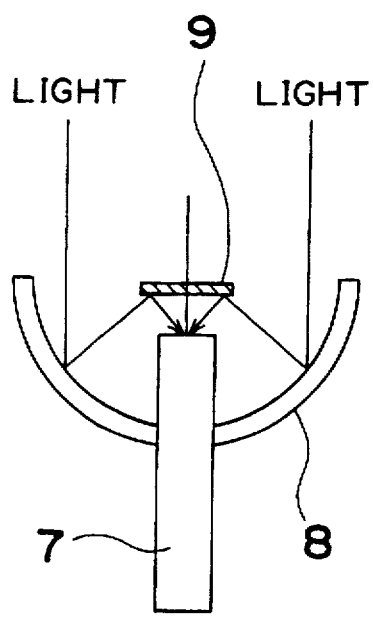
FIGS. 15A and 15B are schematic views showing combination of a parabolic mirror and an optical fiber according to the present invention.

It is possible to more efficiently collect light, for example, by the use of a converging lens 6, such as a fish-eye lens of the form as shown in FIG. 14 or a parabolic mirror 8, etc. as shown in FIG. 15.

Figure 16:
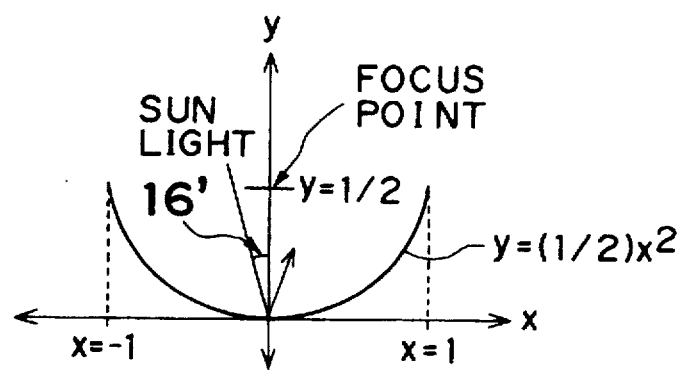
FIG. 16 is a schematic view showing function of the parabolic mirror.

In the case of a parabolic mirror 8, for example, when a parabolic mirror 8 with a curve given by $$y=(½)x^2$$

is rotated around the y axis is used as shown in FIG. 16, let the apparent diameter of the sun be 32', then the radius of the focus (plane) of the light entering the parabolic mirror is given by Focal plane radius=(½).(unit radius).(π/180).(16'/60').

That is, let the unit radius of the parabolic mirror 8 be, for example, 10 cm, then the focal plane radius is 0.23 mm. That is, it is possible to trap all the sun light shining on the 20-cm-diameter parabolic mirror by an optical fiber 7 with a 0.46-mm-diameter core 1.

Figure 15B:
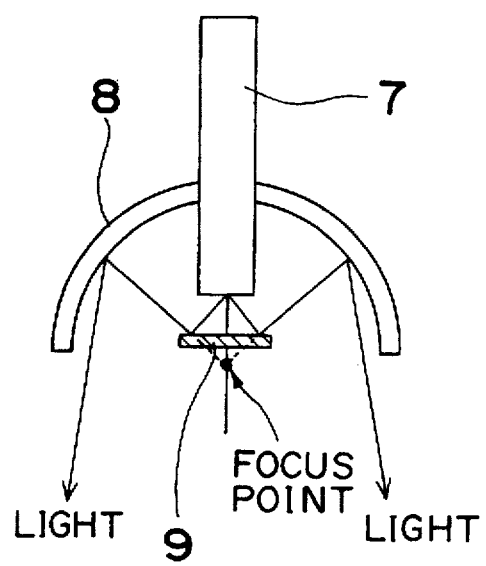

As shown in FIG. 14A, using a plane mirror 9 for allowing the parabolic mirror 8 and collected lights to enter the optical fiber 7, light can be collected more efficiently. In general, when light is reflected by a parabolic mirror 8 and plane mirror 9, part of the light is converted into heat and the converging efficiency lowers. To prevent this, it is preferable to use, for example, a parabolic mirror 8 and a plane mirror 9 aluminum-deposited or otherwise surface treated for better light reflectivity. The reflectivity of this aluminum-deposited sheet is about 90–92%. As shown in FIG. 15B, it is possible to output the collected light at a wide angle by using a parabolic mirror 8 in the same manner. In this case, if a plane mirror 9 is located near the focal point of the parabolic mirror 8, parallel light beams can be obtained, and if it is located nearer to the optical fiber 7 than to the focal point, beams which expand can be obtained.

In addition, as described before, because silica aerogel to be used for optical fiber according to this invention is formed by porous silica skeletons, it provides excellent thermal resistance, and consequently, the optical fiber will not deteriorate even when the core 1 and cladding 2 themselves achieve high temperatures by the optical energy densified by the converging lens 6 or parabolic mirror 8. Furthermore, because of extremely low thermal conductivity of silica aerogel, heat is not transmitted to the outside of the optical fiber 7 and thermal damage to the coating material 5 can be reduced.

Next discussion will be made on the method for manufacturing optical fibers according to this invention.

First of all, examples of a method for generating silica aerogel 3 on the outer surface of the core 1 or the first clad layer 2a include a method for obtaining uniform silica aerogel film by hydrophobic treatment and supercritical drying after gelation by dip-coating silica aerogel in the sol condition or a method for forming silica aerogel 3 by carrying out hydrophobic treatment and supercritical drying after setting the core 1 or the core 1 covered with the first clad layer 2a in the coating material 5, pouring sol into the clearance for gelation.

For a method to form the cladding 2 comprising silica aerogel 3 and air 4 on the core 1 or outer surface of the first clad layer 2a, there are a method in which a ring-form silica aerogel is fabricated in advance and after passing to set the ring-form silica aerogel through the core 1 or the first clad layer 2a at specified intervals, the silica aerogel is fixed with heat-shrinkable tube, etc. as coating material 5 and a method in which bead-form or powder-form silica aerogel fabricated in advance is filled in the clearance between the core 1 or first clad layer 2a and the coating material 5. There is another method for charging powder-form silica aerogel in advance and coating the silica aerogel on the surface of the core 1 or the first clad layer 2a by static electricity.

And as a method for fabricating optical fibers in which a plurality of wire are bound, the above-mentioned methods can also be applied.

In the optical fiber according to this invention, silica aerogel comprising extremely fine silica particles alone or silica aerogel and air is used as the cladding. Because the particle size and the pore size of silica aerogel are far smaller than the optical wavelength, in spite of the porous substance, the silica aerogel provides transparency and refractive index close to that of air. Because the refractive index of this silica aerogel can be varied as required by the raw material compounding ratio, it can be applied to conventional optical fibers having the core with various refractive indices and covered with a plurality of clad layers in advance, and the acceptance angle can be increased. As a result, a greater quantity of light can be transmitted and the light emitting angle at the light-emitting end of optical fiber can also be increased.

EXAMPLES

Referring now to examples, the present invention will be specifically described.

(Example 1)

For the core, φ1.0 mm and 1-m-long quartz glass (refractive index: 1.46) was used to form gelled compound 20 μm thick on the core surface by dip coating. In this event, the sol solution with the chemical composition of tetramethoxy silane oligomer (available from COLCOAT as Methyl Silicate 51; mean molecular weight: about 470), ethanol, water, and 15N aqueous ammonia mixed at mole ratio of 1:43:20:0.20 was used. Then, the above-mentioned gel-form compound was heated and agitated at 40° C. for about 10 minutes in the ethanol solution of 0.2 mol/L hexamethyldisilazane (reagent available from Toray Dow Corning Silicone) for hydrophobic treatment. Then, the quartz glass coated with the said gel-form compound was placed in carbon dioxide at 18° C. and 55 atmospheric pressure, and operation to replace ethanol in the gel-form compound with carbon dioxide was repeated for about 5 minutes, and the system inside was brought to the supercritical conditions of carbon dioxide, 40° C. and 80 atmospheric pressure, and supercritical drying was carried out for 15 minutes. The density of the silica aerogel obtained was 0.10 g/cc, the primary particle size 2–3 nm, and the refractive index 1.03.

One end of this optical fiber was irradiated with He—Ne laser (wavelength: 543.5 nm) and the light-acceptance angle was measured. Light was allowed to enter the fiber edge using a 10-W tungsten lamp as a light source, the illuminance of emitting light was measured by an illumino meter (Custom LX 1330), and the transmitted light quantity was determined. Table 2 shows the results.

(Example 2)

Optical fibers were fabricated in the same manner as in the case of Example 1 except that the sol solution was composed with tetramethoxy silane oligomer (available from COLCOAT as Methyl Silicate 51; mean molecular weight: about 470), ethanol, water, and 15N aqueous ammonia mixed at a molar ratio of 1:120:20:2.16. The density of silica aerogel obtained in this event was 0.05 g/cc, the primary particle size 2–3 nm, and refractive index 1.015.

The light-acceptance angle and transmitted light quantity of the fabricated optical fibers was measured. The results are shown in Table 2.

(Example 3)

Optical fibers were fabricated in the same manner as in the case of Example 1 except that the circumference of the cladding 2 was coated with the coating material 5 of 1-mm-thick black polyethylene, and the light-acceptance angle and the transmitted light quantity were measured. Table 2 shows the results.

(Example 4)

Tetramethoxy silane oligomer (available from COLCOAT as Methyl Silicate 51; mean molecular weight: about 470), ethanol, water, and 15N aqueous ammonia were mixed at a mole ratio of 1:43:20:0.20 and this sol solution was poured into a ring-form die 2.0 mm thick and 3.0 mm wide to fabricate gel-form compounds. Then, the said gel-form compound was heated and agitated in the ethanol solution of 0.2 mol/L hexamethyldisilazane (reagent available from Toray Dow Corning Silicone) at 40° C. for about 2 hours for hydrophobic treatment. Then, the said gel-form compound was placed in carbon dioxide at 18° C. and 55 atmospheric pressure, and operation to replace ethanol in the gel-form compound with carbon dioxide was repeated for about 2 hours to bring the system inside to the supercritical conditions of carbon dioxide, 40° C. and 80 atmospheric pressure, and supercritical drying was carried out for about 24 hours. The density of the ring-form silica aerogel obtained (2.0 mm thick and 3.0 mm wide) was 0.10 g/cc, the primary particle size 2–3 nm, and the refractive index 1.03.

Optical fibers were fabricated in the same manner as in the case of Example 1 except that the said ring-form silica aerogel was applied to the core 1 to provide 10-mm intervals, and the light-acceptance angle and the transmitted light quantity were measured. Table 2 shows the results.

(Example 5)

Optical fibers were fabricated by filling a clearance of the core 1 comprising 1.0-mm-diameter polymethylmethacrylate 1 m long (refractive index: 1.49) and the coating material 5 comprising 6.0-mm-diameter heat-shrinkable tube with hydrophobic-treated 2.0-mm-diameter bead-form silica aerogel used as cladding 2 fabricated in the same manner as in the case of Example 4; then, it was heated with a dryer to shrink the heat shrinkable tube. The light-acceptance angle and the transmitted light quantity of this optical fiber were measured in the same manner as in the case of Example 1. The results are shown in Table 2.

(Example 6)

Optical fibers were fabricated by binding 0.1-mm-diameter and 1-m-long quartz glass (refractive index 1.46) to make 1.0-mm-diameter core 1, filling the clearance between the 1.0-mm-diameter core 1 and the coating material 5 comprising 3.0-mm-diameter heat shrinkable tube with powder-form silica aerogel used as cladding 2 of 1.0 mm in mean diameter fabricated and hydrophobic-treated in the same manner as in the case of Example 4, and drying with a dryer to shrink the heat shrinkable tube. The light-acceptance angle and the transmitted light quantity of this optical fiber were measured in the same manner as in the case of Example 1. Table 2 shows the results.

(Comparison 1)

Optical fibers were fabricated in the same manner as in the case of Example 1 except that fluorocarbon resin of refractive index 1.39 was used as cladding 2 in Example 1, and the light-acceptance angle and the transmitted light quantity were measured. Table 2 shows the results.

(Example 7)

Optical fibers were fabricated by using a plastic fiber (available from Mitsubishi Rayon Co., Ltd. as ESKA, Article No. CK-40C, 1 mm in diameter and 1 m long) which comprises the core 1 (refractive index: 1.49) of polymethylmethacrylate, coated with the first clad layer 2a (refractive index: 1.40) of a fluorocarbon resin in advance, to which silica aerogel hydrophobic-treated in the same manner as in the case of Example 1 was coated as the second clad layer 2b. The light-acceptance angle and the transmitted light quantity of this optical fiber were measured in the same manner as in the case of Example 1. Table 2 shows the results.

(Example 8)

Optical fibers were fabricated in the same manner as in the case of Example 7 except that the silica aerogel fabricated in the same manner as in the case of Example 2 was used for the second clad layer 2b in Example 7 and the light-acceptance angle and the transmitted light quantity were measured. Table 2 shows the results.

(Example 9)

Optical fibers were fabricated in the same manner as in the case of Example 7 except that the circumference of the second clad layer 2b was coated with the coating material 5 of 1-mm-thick black polyethylene in Example 7 and the light-acceptance angle and the transmitted light quantity were measured. Table 2 shows the results.

(Example 10)

Optical fibers were fabricated in the same manner as in the case of Example 7 except that the ring-form silica aerogel 2.0 mm thick and 3.0 mm wide fabricated in the same manner as in the case of Example 4 was applied as the second clad layer 2b to provide 20-mm intervals, and the light-acceptance angle and the transmitted light quantity were measured. Table 2 shows the results.

(Example 11)

Optical fibers were fabricated by filling a clearance of the coating material 5 comprising plastic optical fiber shown in Example 7 and 7.0-mm-diameter heat-shrinkable tube with hydrophobic-treated 2.0-mm-diameter bead-form silica aerogel fabricated in the same manner as in the case of Example 4; then, it was heated with a dryer to shrink the heat shrinkable tube. The acceptance angle and the transmitted light quantity of this optical fiber were measured in the same manner as in the case of Example 1. Table 2 shows the results.

(Comparison 2)

Optical fibers were fabricated in the same manner as in the case of Example 7 except that 1-mm-thick black polyethylene was coated as coating material 5 in place of silica aerogel which formed the second clad layer 2b in Example 7, and the light acceptance angle and the transmitted light quantity were measured. Table 2 shoes the results.

TABLE 2

| | Light acceptance angle | Illuminance at light-emitting end (lux) |
|---|---|---|
| Example 1 | 90° | 105 |
| Example 2 | 90° | 101 |
| Example 3 | 90° | 104 |
| Example 4 | 90° | 105 |
| Example 5 | 90° | 96 |
| Example 6 | 90° | 88 |
| Comparison 1 | 32° | 30 |
| Example 7 | 90° | 100 |
| Example 8 | 90° | 102 |
| Example 9 | 90° | 101 |
| Example 10 | 90° | 98 |
| Example 11 | 90° | 100 |
| Comparison 2 | 31° | 25 |

The results of Table 2 indicate that Examples 1–11 achieve greater light-acceptance angle and transmitted light quantity as compared to Comparisons 1 and 2.

Because the optical fiber according to the present invention comprises the core and the cladding which covers the outer surface of the core and provides smaller refractive index than that of the core, wherein the said cladding or the outermost layer of a plurality of clad layers comprises silica aerogel alone consisting of porous silica skeletons or the silica aerogel and air, the optical fiber provides a large acceptance angle and can transmit larger quantity of light.

What is claimed is:

1. An optical fiber comprising:

a core extending in a longitudinal direction and a cladding for covering the outer peripheral surface of said core and having a lower refractive index than that of said core, wherein said cladding comprises silica aerogel having a porous skeleton structure represented by the formula:

$$-(SiO_2)n-$$

wherein n is a positive integer.

2. The optical fiber according to claim 1, wherein said silica aerogel contains silica globular particles having a primary particle diameter of 1 to 10 nm and linked together like a rosary to have air spaces uniformly distributed.

3. The optical fiber according to claim 1, further comprising an outer shield layer formed on the cladding.

4. The optical fiber according to claim 3, wherein the cladding comprises plural silica aerogel rings arranged at intervals in a longitudinal direction of said core and air spaces are defined between said neighboring silica aerogel rings.

5. The optical fiber according to claim 3, wherein the cladding comprises plural attachment spacers of silica aerogel distributed uniformly on the core and air spaces are defined between said neighboring silica aerogel protrusions.

6. The optical fiber according to claim 1, wherein said cladding comprises plural layers laminated in a radial direction, the outermost clad layer being a silica aerogel single layer.

7. The optical fiber according to claim 3, wherein said cladding comprises plural layers laminated in a radial direction, the outermost clad layer being silica aerogel rings arranged in parallel and having air spaces between said silica aerogel rings.

8. The optical fiber according to claim 3, wherein the cladding is made of an organic modified hydrophobic silica aerogel.

9. The optical fiber according to claim 1, wherein the cladding is silica aerogel having a density of 0.02 to 0.5 g/cm$^3$.

10. The optical fiber according to claim 1, wherein the cladding is silica aerogel having a refractive index of 1.008 to 1.18.

11. The optical fiber according to claim 1, wherein the silica aerogel of the cladding is prepared by polymerizing a hydrolyzed alkoxysilane before a supercritical drying treatment.

12. The optical fiber according to claim 1, wherein the silica aerogel of the cladding is a material subjected to a hydrophobic treatment before or during the supercritical drying.

* * * * *